Feb. 14, 1967   M. FINGEROOT ETAL   3,303,830
ROTOR FOR ROTARY COMBUSTION ENGINE
Filed April 22, 1966   2 Sheets-Sheet 1

INVENTORS,
MAX FINGEROOT
PAUL L. ULRICH
BY
Carl J. Barbee
ATTORNEY

Feb. 14, 1967   M. FINGEROOT ET AL   3,303,830
ROTOR FOR ROTARY COMBUSTION ENGINE
Filed April 22, 1966   2 Sheets-Sheet 2

INVENTORS,
MAX FINGEROOT
PAUL L. ULRICH
BY
Carl J. Barbee
ATTORNEY

United States Patent Office 3,303,830
Patented Feb. 14, 1967

3,303,830
ROTOR FOR ROTARY COMBUSTION ENGINE
Max Fingeroot, Oak Park, and Paul L. Ulrich, Redford, Mich., assignors to American Motors Corporation, Kenosha, Wis., a corporation of Maryland
Filed Apr. 22, 1966, Ser. No. 544,465
10 Claims. (Cl. 123—8)

This invention relates generally to rotary combustion engines and more particularly to an improvement for increasing the cooling efficiency of the engine rotor.

In four cycle rotary engines having five working chambers in the stator and a four lobed, eccentric mounted, and epicyclic gearing controlled rotor for use therewith, it is known that two opposed lobes of the four are the so-called hot lobes. That is, the fuel combustion or explosion always occurs against same. As a consequence, greater efforts must be made to cool these lobes as well as to provide for relatively uniform rotor cooling.

Increasing the difficulty of cooling the rotor, which is located inside the stator, is the fact that oil is commonly used as the cooling medium besides being the lubricant for the engine bearings. It is currently not possible to achieve turbulent flow for a satisfactory heat transfer coefficient under these conditions. Diffusing or baffling means have also proved to be unsatisfactory.

Applicants have, therefore, designed a rotor that provides separate labyrinth paths for laminar oil flow on each internal side of the apex of each hot lobe. The cold lobes have their internal surfaces cooled (or even heated, if necessary) in conventional fashion. When necessary, additional bleed holes from the labyrinths are provided to prevent stagnation of the coolant in areas radially remote from the rotor external surface. Tests have demonstrated that sending the coldest oil to the hot lobes and forcing same through the serpentine path of each labyrinth, which also provides increased cooling surface and structural rigidity, and then to the cold lobes has markedly increased the cooling efficiency of the rotor. Contributing substantially to this improved cooling is the mixing of the hot outer layer of oil adjacent the labyrinth walls into the bulk of the oil as same makes successive changes of direction through the labyrinth. Of course, improved rotor cooling also contributes to prolonged life of the seals associated therewith.

Although the rotor embodiment shown has four lobes, it is to be understood that the labyrinth construction could be incorporated into rotors of varied configurations. Similarly, while the embodiment shown is intended for oil cooling, it is to be understood that other cooling mediums such as water could also be used where suitable oil and water separating means are provided.

It is, therefore, an object of this invention to provide a new and improved rotor for a rotary combustion engine.

Another object of this invention is to provide a rotor having labyrinth means for a serpentine coolant flow through the hot lobes of the rotor.

Other objects and advantages will become apparent from the following description in conjunction with the attached drawings in which.

Figure 1:
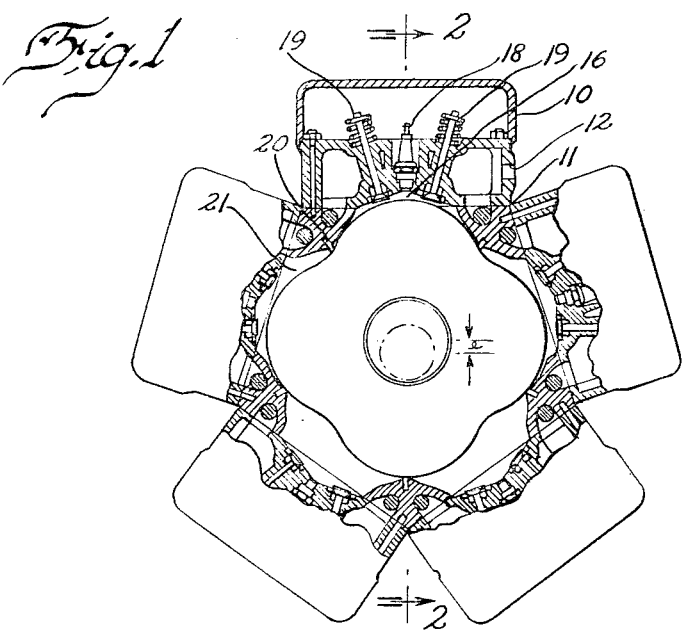
FIGURE 1 is a transverse section of a rotary engine with the rotor of this invention located therein.
Figure 2:
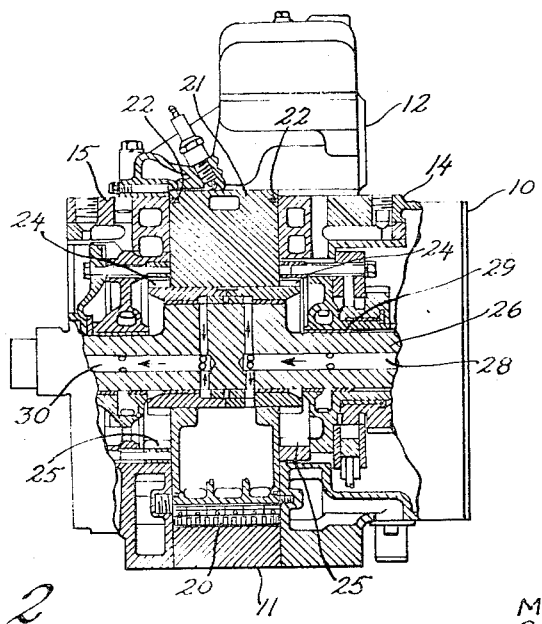
FIGURE 2 is a slightly enlarged longitudinal section taken along line 2—2 of FIGURE 1 (with the rotor in a slightly rotated position)

Referring to FIGURES 1 and 2, 10 indicates a rotary combustion engine. Engine 10 has a stator 11 which in conjunction with heads 12, front housing 14 and rear housing 15, forms five radially spaced combustion chambers 16. A spark plug 18 and a pair of valves 19 are associated with each combustion chamber. Segmented stator seals 20 bearing against rotor 21 and epicycloidal rotor seals 22 bearing against the front and rear housings 14 and 15 seal off the combustion chambers. Rotor 21 also has an epicycloidal profile of four lobes designed for use with the above-noted combustion chambers.

Keyed to rotor 21 are external gears 24 which in conjunction with fixed internal gears 25 position the rotor lobes for movement into and out of the combustion chambers. Rotor 21 and gears 24 are mounted on crankshaft 26 having eccentricity $e$.

Rotor 21 is cooled by pumping preferably oil (as indicated by the arrows) thereto via inlet passage 28 in crankshaft 26. Passage 28 also has suitable exits for the lubrication of front main bearing 29 and the front rotor bearing. Front external gear 24 has apertures aligned with complementary rotor construction for the movement of oil from passage 28 into the rotor 21. Rear external gear 24 also has apertures therethrough for the exit of oil in similar manner from rotor 21 into passage 30 and thence from the engine to a suitable cooler.

Figure 4:
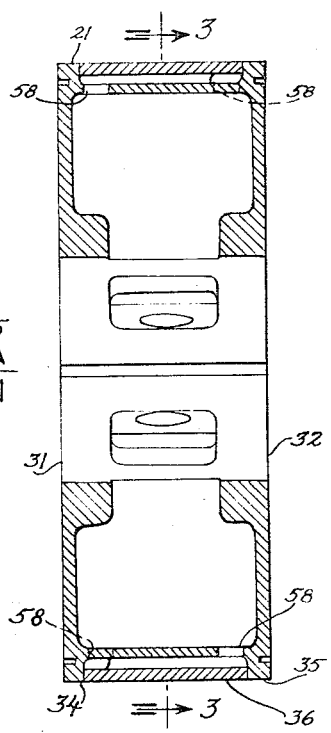
FIGURE 4 is a section taken along line 4—4 of FIGURE 3.
Figure 5:
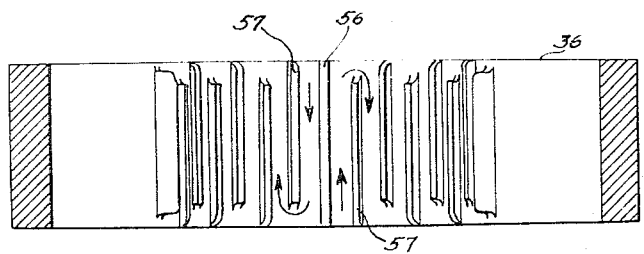
FIGURE 5 is a section taken along line 5—5 of FIGURE 3 showing only the rotor envelope or rim with its labyrinth construction.

The engine 10 and the method of introducing cooling oil into and out of the rotor is conventional. Applicants' contribution is the improved rotor as best shown in FIGURES 3 through 5.

Rotor 21 is constructed of three pieces primarily to simplify its manufacture. Identical hub portions 31 and 32 are fused together (back-to-back) along section line 3—3. Hub portions 31 and 32, which form the side walls of the rotor, have peripheral flanges 34 and 35 respectively. Rim or rotor envelope 36 is also fused between these flanges to create a single integral unit. The fusing may be accomplished by placing suitable shim material at the joints and heat treating the rotor until fusion has occurred.

As mentioned previously, only two opposed lobes of rotor 21 are subjected to the heat of fuel combustion during engine operation. These hot lobes are denominated 38 and 39 respectively while the cold lobes are numbered 40 and 41.

Figure 3:
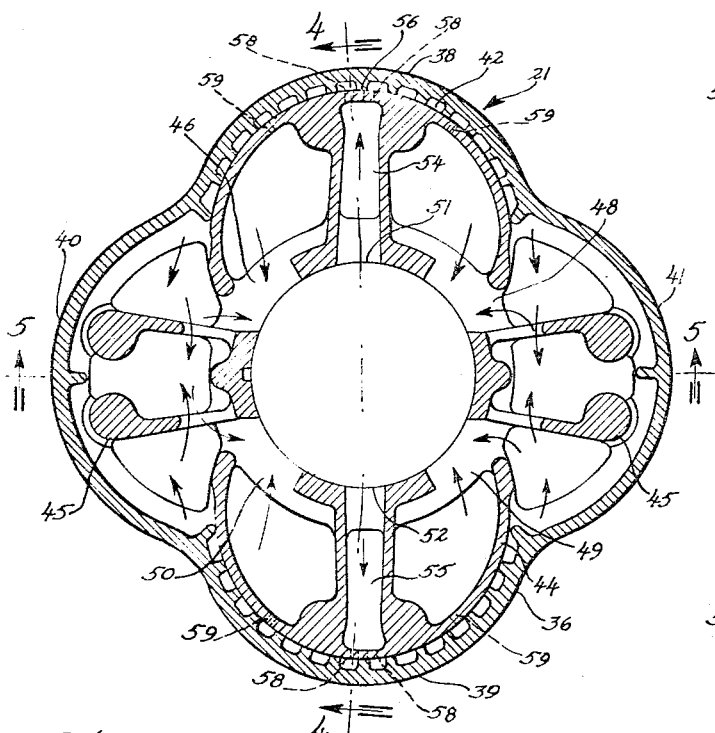
FIGURE 3 is a transverse section of the rotor taken along line 3—3 of FIGURE 4.

Referring to FIGURE 3, hub portion 32 shown is constructed especially for use under the hot and cold lobe conditions. Hub portion 32 has an inner wall 42 associated with and generally parallel to hot lobe 38 and an inner wall 44 similarly associated with lobe 39. The inner walls provide structural rigidity to these areas of the rotor 21 besides providing a coolant passage in conjunction with the inner surface of the rim 36. Hub portion 32 also has a pair of spaced (for coolant flow therebetween) bosses 45 at each cold lobe 40 and 41. Besides providing rigidity, the bosses also are used in balancing the rotor as are the integral bosses in inner walls 42 and 44.

Referring to FIGURE 2 in conjunction with FIGURE 3, the central areas of hub portions 32 and 31 are adapted to be keyed to and mounted on rotor gears 24. Openings 46, 48, 49 and 50 are aligned with apertures in rear rotor gear 24 for exit of coolant from rotor 21. Opposed openings 51 and 52 are aligned with apertures in front rotor gear 24 for admittance of coolant into rotor 21. Radial passages 54 and 55 connect openings 51 and 52 to the hot lobes 38 and 39.

Rim 36, as also shown in FIGURE 5, has a central rib 56 extending from its inner surface at the apex of hot lobe 38 and contacting the outer surface of inner wall 42. Rib 56 also extends the full width of rim 36 and contacts and is generally normal to flanges 34 and 35. Succeeding ribs 57 on each side of central rib 56 are similar thereto but alternate in extending from flange 34 and not contacting flange 35 and then from flange 35 and not contacting flange 34. Thus, at lobe 38 the ribs create separate labyrinth passages on each side of the apex of the lobe. Slotted holes 58 or ports through inner wall 42 (of portions 31 and 32) on both sides of central rib 56 connect radial passage 54 with the separate labyrinth passages. Bleed holes 59 through wall 42 connect each labyrinth passage with the cavities inward of inner wall 42 to prevent stagnation of oil therein. A construction similar to that detailed is utilized for hot lobe 39.

In operation, cold oil is pumped through passage 28 in crankshaft 26 and out the radial extensions thereof through apertures in front rotor gear 24 and into rotor 21 via opposed aligned openings 51 and 52. The oil moves in the direction of the arrows up through radial passage 54 in lobe 38 and exits therefrom through slotted openings 58 located on each side of center rib 56. The oil moves through the labyrinth created by ribs 57 on each side of lobe 38. At one end of inner wall 42, some of the oil flows between bosses 45 of lobe 40 equalizing the temperature of this lobe. The oil leaving the other labyrinth passes around the other end of wall 42 and performs a similar function for lobe 41. Bleed holes 59 send some oil into the cavities inward of wall 42 on each side of lobe 38 to prevent stagnation of oil located therein.

The oil moving through radial passage 55 to lobe 39 cools same in a similar manner. A portion of this oil also equalizes the temperature of cold lobes 40 and 41. All of the oil admitted to the rotor then leaves same via openings 46, 48, 49 and 50 which are aligned with apertures in rear rotor 24. This oil flows through the radial extensions thereof and through passage 30 out of engine 10 to be cooled by a suitable cooling means.

In view of the above-detailed description, it is readily apparent that even under laminar flow conditions the serpentine oil flow through the labyrinths increases the cooling capacity of the oil.

Having thus described the invention, it will be apparent to those skilled in the art that various modifications and changes can be made therein without departing from the spirit of the invention or the scope of the appended claims.

We claim:
1. A rotor for a rotary combustion engine comprising:
   (a) an outer peripheral rim;
   (b) side walls extending inwardly from said rim;
   (c) an inner wall extending between said side walls inward of said rim;
   (d) a series of spaced ribs with each rib extending from said rim inner surface to the outer surface of said inner wall and between said side walls, succeeding ribs of said series alternately extending from one side wall toward but not contacting the other and from the other side wall toward one side wall but not contacting the one side wall to form a labyrinth type passage for the flow of a liquid coolant between the inner surface of said rim and the outer surface of said inner wall.
2. The rotor of claim 1 further comprising:
   (a) first port means for the introduction of a liquid coolant to said labyrinth passage;
   (b) second port means for exit of the coolant.
3. The rotor of claim 2 in which said side walls also extend generally normally from said rim and each of said ribs extend generally normally between said side walls.
4. The rotor of claim 3 in which said ribs are integral extensions from the inner surface of said rim.
5. The rotor of claim 4 in which said inner wall has at least one bleed hole therethrough into said labyrinth passage for the movement of coolant into the area inward of said inner wall and then out of the rotor.
6. The rotor of claim 5 in which said outer peripheral rim has an outer epicycloidal profile of four lobes adapted to engage mating chambers of a five lobed stator and said inner wall consists of two spaced portions, one portion also extending generally parallel to one of two opposed lobes of said rim and the other to the second lobe and said ribs extending to the outer surface of each of said inner wall portions.
7. A rotor for a rotary combustion engine comprising:
   (a) an outer peripheral rim, said rim having an outer epicycloidal profile of four equally spaced lobes adapted to engage mating chambers of a five lobed stator;
   (b) side walls extending inwardly and generally normally form said rim;
   (c) an inner wall consisting of two spaced portions extending between said side walls inward of said rim, one portion being generally parallel to one of two opposed rim lobes and the other portion being generally parallel to the second lobe;
   (d) a series of spaced ribs for each one of said two opposed lobes with each rib extending from said rim inner surface to the outer surface of each associated portion of said inner wall and generally normally between said side walls, one rib extending from one side wall to the other at the apex of each of said two opposed lobes, succeeding ribs on each side of said full length rib alternately extending from one side wall toward the other but not contacting the other and from the other side wall toward one side wall but not contacting the one side wall to form a labyrinth type passage on each side of each of the said two opposed lobes;
   (e) first port means for the introduction of a liquid coolant into the labyrinth passage for movement therethrough on each side of said full length rib of each of said lobes;
   (f) second port means for the exit of the coolant from each labyrinth passage.
8. The rotor of claim 7 in which said ribs are integral extensions from the inner surface of said rim.
9. The rotor of claim 8 further comprising:
   (a) first conduit means for directing the lubricant flow from opposed labyrinth passages against the interior surface of a third lobe to equalize the temperature of same;
   (b) second conduit means for directing the lubricant the other opposed labyrinth passages against the interior surface of a fourth lobe;
   (c) means for exit of coolant from the rotor.
10. The rotor of claim 9 in which each of said inner wall portions has bleed holes into each labyrinth passage for the movement of coolant into the areas inward of said inner wall to aid exit of oil therefrom.

References Cited by the Examiner

UNITED STATES PATENTS

| 3,111,884 | 11/1963 | Peras | 123—8 |
| 3,112,870 | 12/1963 | Bentele | 230—210 |
| 3,131,679 | 5/1964 | Peras | 103—130 |
| 3,204,614 | 9/1965 | Huber | 230—210 |

FOREIGN PATENTS

| 688,172 | 5/1930 | France. |
| 974,370 | 11/1964 | Great Britain. |
| 978,210 | 12/1964 | Great Britain. |

DONLEY J. STOCKING, *Primary Examiner.*

W. J. GOODLIN, *Assistant Examiner.*